United States Patent
Wagner et al.

(10) Patent No.: US 12,376,601 B2
(45) Date of Patent: Aug. 5, 2025

(54) SYSTEMS AND METHOD FOR REMOVING THE YELLOW COLOR OF RIBOFLAVIN FROM LACTOSE SOLUTIONS

(71) Applicant: SPX Flow Technology Danmark A/S, Søborg (DK)

(72) Inventors: Peter Wagner, Søborg (DK); Martin Landerslev, Søborg (DK)

(73) Assignee: SPX Flow Technology Danmark A/S, Soborg (DK)

( * ) Notice: Subject to any disclaimer, the term of this patent is extended or adjusted under 35 U.S.C. 154(b) by 0 days.

(21) Appl. No.: 18/575,493

(22) PCT Filed: Jul. 4, 2022

(86) PCT No.: PCT/EP2022/068444
§ 371 (c)(1),
(2) Date: Dec. 29, 2023

(87) PCT Pub. No.: WO2023/275404
PCT Pub. Date: Jan. 5, 2023

(65) Prior Publication Data
US 2024/0260597 A1    Aug. 8, 2024

Related U.S. Application Data

(60) Provisional application No. 63/218,029, filed on Jul. 2, 2021.

(51) Int. Cl.
*A23C 7/04* (2006.01)
*A23L 5/30* (2016.01)
(Continued)

(52) U.S. Cl.
CPC .................. *A23C 7/04* (2013.01); *A23L 5/30* (2016.08); *A23L 5/49* (2016.08); *C13K 5/00* (2013.01)

(58) Field of Classification Search
CPC .... A23C 7/04; A23L 5/30; A23L 5/49; C13K 5/00
(Continued)

(56) References Cited

U.S. PATENT DOCUMENTS 4,099,983 A    7/1978 Wittenberg
4,316,749 A    2/1982 Evans et al.

FOREIGN PATENT DOCUMENTS

EP         3519593 A1    8/2019

OTHER PUBLICATIONS

Dos Anjos et al. J. Dairy Science 103:1261-1268 (Year: 2020).*
(Continued)

*Primary Examiner* — Subbalakshmi Prakash
(74) *Attorney, Agent, or Firm* — IceMiller LLP (57) ABSTRACT

The disclosure provides methods and apparatuses for removing a yellow color of riboflavin in a lactose solution. The methods include exposing a lactose solution (e.g. milk) containing riboflavin to light under conditions that breakdown riboflavin comprised within the solution to thereby remove the yellow color of riboflavin. The conditions that breakdown include a specific wavelength of light (e.g. light having a wavelength of 360-475 nm) and a specific temperature range (e.g. a temperature of 0-80° C.). In certain embodiments, the duration of the treatment is such that the lactose solution is exposed to a total of 5-20 kW of light.

21 Claims, 2 Drawing Sheets

(51) Int. Cl.
*A23L 5/49* (2016.01)
*C13K 5/00* (2006.01)

(58) Field of Classification Search
USPC .......................................................... 426/491
See application file for complete search history.

(56) References Cited

OTHER PUBLICATIONS

Sheraz et al. Beilstein J. Org. Chem. 2014, 10, 1999-2012. (Year: 2014).*
International Search Report & Written Opinion issued in PCT/EP2022/068444, mailed Nov. 21, 2022 [8 pages].
Assis, RQ et al., "Active food packaging of cellulose acetate: Storage stability, protective effect on oxidation of riboflavin and release in food simulants", Food Chemistry, Jul. 2021, vol. 349 [6 pages].

* cited by examiner

SYSTEMS AND METHOD FOR REMOVING THE YELLOW COLOR OF RIBOFLAVIN FROM LACTOSE SOLUTIONS

CROSS-REFERENCE TO RELATED APPLICATIONS

This application is a National Stage of International Patent Application No. PCT/EP2022/068444, filed on Jul. 4, 2022, which claims priority to U.S. Provisional Application No. 63/218,029, filed Jul. 2, 2021, the disclosures of which are hereby incorporated by reference in their entirety.

TECHNICAL FIELD

The subject disclosure relates to systems and methods of removing the yellow color of riboflavin from lactose solutions.

BACKGROUND

The yellow color of riboflavin is undesired in many applications where lactose is used as an ingredient, so it is often removed during the process of making lactose. The method used in the industry today is removal of color by applying activated carbon. However, this method has several disadvantages.

The machines configured to apply activated carbon to remove yellow colorants from lactose have a large space requirement, both in height and floor area. This is because industrial scale adsorption of colorants typically requires three tanks—each about 15-30 cubic meters—where two larger tanks have carbon. In operation, while one tank is use, the other is regenerated using a caustic solution in a third tank.

The capital expense costs of acquiring, upgrading, and maintaining the machines and systems configured to apply activated carbon to lactose (CAPEX) is high due to the multiple big tanks and complex automation required.

The environmental footprint in form of emissions, effluent, and water usage is high. The water consumption is high due to regeneration of the carbon after use, which typically is done daily. Regeneration requires multiple steps of applying a water, caustic, and acid solution over the carbon tank being regenerated. Even if the caustic can be partially reused, the overall consumption of water is high because the chemicals have to be effectively flushed out of the carbon. The large amount and fluctuating composition in pH and total solids (TS) of the wastewater can be a challenge in wastewater treatment.

In current embodiments, there is too much variation in the residual color after the carbon treatment. Initially, the efficiency of a packed column of activated carbon is extremely high, typically much better than needed. Then, at the end of the batch, the color out of the column is typically close to the maximum acceptable residual color. Thus, resulting lactose powder from the start of the batch often has less color than powder from the end of the batch even if both are below the acceptable limit typically, e.g., of 2 parts-per-million (ppm). If the two resulting lactose powders (those resulting from a new packed column of activated carbon versus those resulting from a packed column towards the end of its life cycle) are compared visually next to each other, then a customer may be able to see that one is whiter than the other.

It is not possible to make a good sanitary design of an activated carbon column since the surface area of activated carbon is extremely high and only a small amount of mixing of the carbon is practically feasible during regeneration of the carbon column.

During the start and especially the end of a run on a carbon column there will be a loss of lactose and a dilution of the lactose. Typically, the loss can be reduced by increasing the dilution and by spending more time in the start-up and end of a run on the carbon column. However, if manufacturing plant is running at full capacity, then in practice there may not be time for this optimal procedure.

Another disadvantage to current methods and systems of removing the yellow color of riboflavin during the process of making lactose is its low flexibility of the color removal capacity. Once the activated carbon columns have been installed, filled with carbon, and are in operation, the capacity cannot typically be easily increased without significant impact on space and the CAPEX requirement.

Thus, there is a need for an improvement to systems and methods for removing the yellow color of riboflavin from lactose.

SUMMARY

The disclosure provides for systems and methods for removing the yellow color of riboflavin from lactose.

One embodiment of the disclosure is a method of removing yellow color of riboflavin in a lactose solution which includes the steps of: receiving a lactose solution comprising riboflavin, via an apparatus having a substantially clear medium that allows light to pass through, wherein the light is configured to breakdown the riboflavin comprised within the solution, creating broken down riboflavin; and exposing, through the substantially clear medium, the lactose solution to light under conditions to breakdown the riboflavin comprised within the solution. to thereby remove yellow color of riboflavin. The method also includes further processing after removal of the yellow color. For example, the lactose solution can be crystallized after exposure to light.

Another embodiment of the disclosure is directed to a method for removing yellow color of riboflavin comprising exposing a lactose solution comprising riboflavin to light under conditions to breakdown the riboflavin comprised within the solution to thereby remove yellow color of riboflavin. The method can include further process. In certain embodiments, the method includes removal of the breakdown product of riboflavin.

The methods of the disclosure include expose the lactose solutions at a specific wavelength. In certain embodiments, the methods include exposing the lactose solution to light having a wavelength of 360-475 nm, alternatively a wavelength of 440-457 nm, alternatively a wavelength of about 450 nm.

A variety of light sources are used to generate the light. In certain embodiments, the light is generated by a light emitting diode. In some embodiments the light emitting diode has a wattage from 50-70 W.

The lactose solution that is treated using the methods of disclosure can have a temperature range of about 0-80° C. Accordingly, in one embodiment, the methods include exposing a lactose solution at a temperature of 0-80° C. to the light. In other embodiments, the methods include exposing a lactose solution at a temperature of 70-80° C. to the light. In other embodiments, the methods include exposing a lactose solution at a temperature of 50-70° C. to the light. In further embodiments, the methods include exposing a lactose solution at a temperature of about 5° C. to the light.

The pH of the lactose solution treated using the methods of the invention can vary. For example, in some embodiments, the lactose solution has an alkaline pH. In other embodiments, the lactose solution has an acidic pH.

In some embodiments of the methods, the lactose solution is exposed to a total of 1-100 kW of light or 5-20 kW of light. Alternatively, the lactose solution is exposed to a total of 6-15 kW of light. Alternatively, the lactose solution is exposed to a total of 6-14 kW of light.

In some embodiments of the disclosure, the lactose solution has a specific exposure of 500 [J/kg] to 10000 [J/kg] of the solution, alternatively 1000 [J/kg] to 3500 [J/kg] of the solution.

The disclosure also provides for an apparatus removing the yellow color of riboflavin from lactose. Such an apparatus can be a convention UV reactor in which the light source has been changed to a light source emitting a wavelength suitable for treating riboflavin.

In one embodiment, the apparatus includes a conduit, an inlet and outlet. The conduit has a transparent section behind which the light source is placed. The conduit is transparent to the light emitted by the light sources. In some embodiments, the apparatus omits the transparent section, and the light source is placed on the inside of the conduit.

Various additional features and advantages of this invention will become apparent to those of ordinary skill in the art upon review of the following detailed description of the illustrative embodiments taken in conjunction with the accompanying drawings.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DESCRIPTION

The disclosure provides systems (units) and methods for removing the yellow color of riboflavin from lactose. The system and methods of the disclosure rely on light to remove the yellow color of riboflavin.

The methods of the disclosure generally involve exposing a lactose containing solution (e.g. milk or a milk-derived product) comprising riboflavin under conditions that breakdown the riboflavin to thereby remove the yellow color of riboflavin from lactose. The methods of the disclosure can be used to improve the visual appearance of lactose containing solutions.

It is to be understood that this invention is not limited to the specific devices, methods, applications, conditions, or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

The present invention addresses the disadvantages of current systems and methods. A unit of the present invention, similar to the capacity of two 15-30 cubic meter carbon tanks currently used in decoloring lactose, requires a building height of less than three meters and approximately 12 square meters of floor space. This is less than one-third of the specific requirements of the present technology which enables installation at factories where no decoloring technology can presently be installed.

The CAPEX of a unit embodying the present invention will be significantly lower than the current technology, and the present invention can be used as a stand-alone unit with a simple interface to existing automation of an overall manufacturing plant.

A unit embodying the present invention can be placed in line with other devices or systems used during manufacturing/processing of lactose products. Extra water consumption (beyond that used for current technologies) may be needed for higher flow or slightly longer clean-in-place (CIP) of the line in which it is installed. Compared to the water and chemical consumption needed for regeneration of a carbon column, this is negligible. This also enables a much faster start-up of a manufacturing/processing plant or a portion thereof.

In an embodiment of the present invention, the efficiency of the unit during a batch is in principle unchanged even if batch is running over multiple days. The result is a consistent final product quality in terms of color. With new systems embodying the present invention, it is possible to make lactose with different color scales directly, which is a big advantage.

Figure 1:
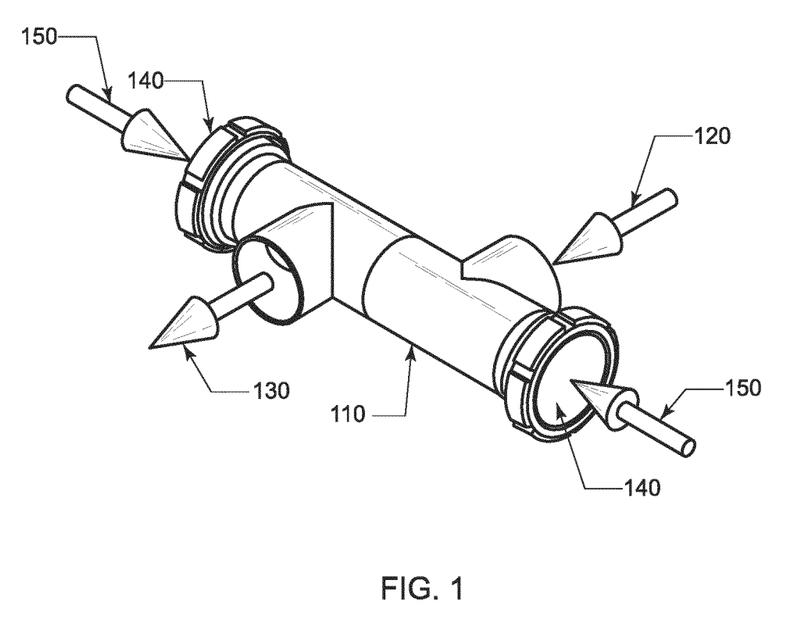
FIG. 1 shows an embodiment of a unit for removing yellow color of riboflavin in a lactose solution of the disclosure.

FIG. 1 shows an embodiment of a unit for removing yellow color of riboflavin in a lactose solution of the disclosure. Specifically, FIG. 1 shows unit 100 having conduit 110. The conduit 110 has inlet 120 and outlet 130. The lactose containing unit flows from inlet 120 to outlet 130. The conduit 110 has a transparent section 140 at either end of the conduit. Light source 150 is placed behind transparent section 140. In certain embodiments, the conduit has more than one transparent section 140. In other embodiments, the conduit has only one transparent section 140. In other embodiments, the light source 150 is integral with the conduit 110. While the inlet 120 and outlet 130 are perpendicular to the conduit 110, the orientation of the inlet 120 and outlet 130 varies. In some embodiments, the inlet 120 and/or the outlet 130 are in line with the conduit.

Figure 2:
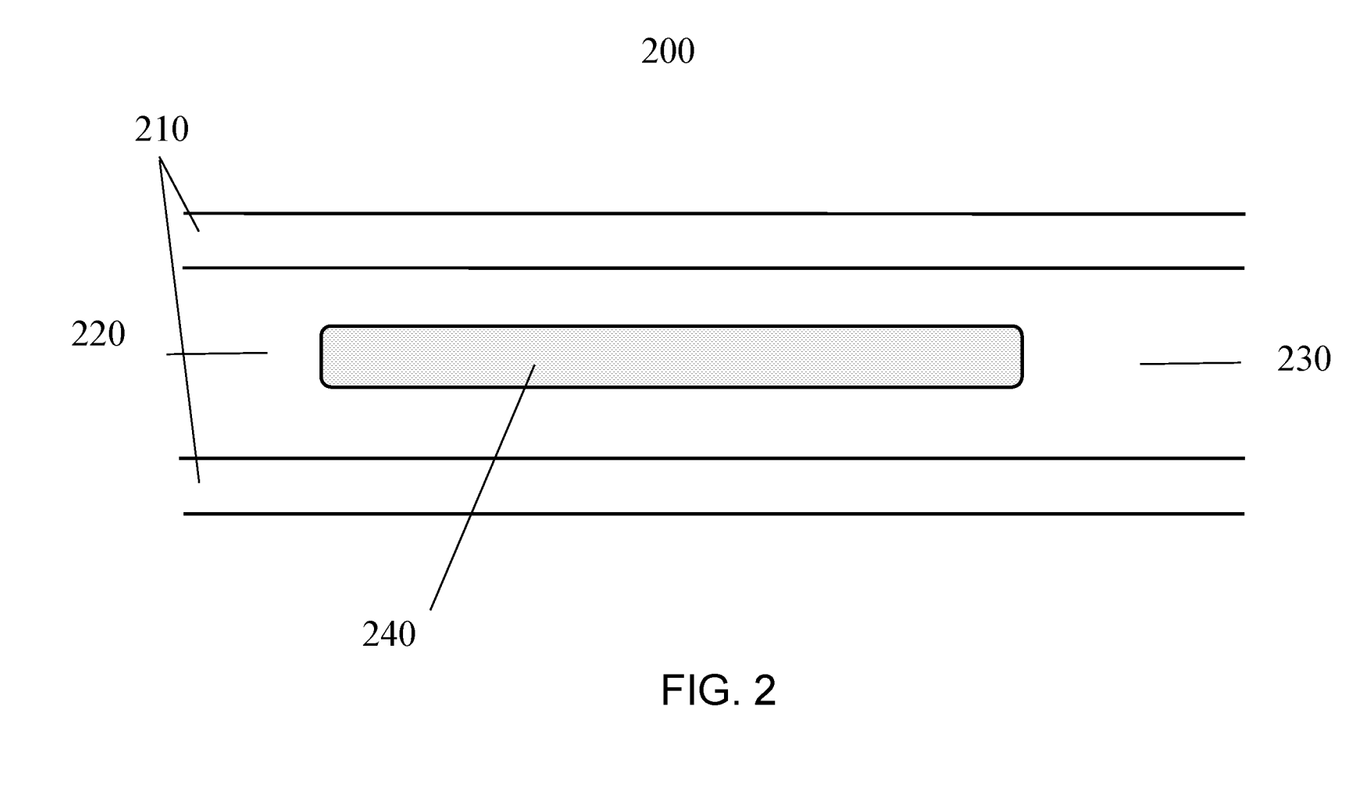
FIG. 2 shows a cross-sectional view of another embodiment of a unit for removing yellow color of riboflavin in a lactose solution of the disclosure.

FIG. 2 shows a cross-sectional view of another embodiment of a unit for removing yellow color of riboflavin in a lactose solution of the disclosure. In the embodiment shown in FIG. 2, the light source is placed internally inside the conduit so that the conduit does not require a transparent portion. Specifically, FIG. 2 shows unit 200 which has conduit 210. The conduit 210 has inlet 220 and outlet 230, with the direction of flow being from inlet 220 to outlet 230. Inside the conduit, light source 240 is located. While the inlet 220 and outlet 230 are shown in-line with the conduit 210, the orientation of the inlet 220 and outlet 230 varies. In some embodiments, the inlet 220 and/or the outlet 230 are perpendicular to the conduit.

A unit embodying the present invention can easily be made with a sanitary design and CIP together with the pipe in which it is installed.

In the present invention, the loss of lactose is very small when decoloring the riboflavin in the lactose, and with very little dilution of the product during the start up and end of production. It is comparable to losses/dilution seen in pipelines. It can be made drainable if focus on reducing dilution/loss to a minimum is needed.

The unit comprising the present invention has modules in certain embodiments. In certain embodiments, additional modules may be attached to the conduit at either the intake or outlet. If at a later time there is a need for extra manufacturing or processing capacity in other embodiments, then extra modules (which contain e.g., an additional light source) can easily be installed inside the unit, so that in most cases a capacity increase will have no impact on the space requirement of the overall unit.

Riboflavin is not stable when exposed to light over time. Studies have been done with the purpose of avoiding riboflavin break down in foods over time when stored. In the present invention, light is used to breakdown the riboflavin during the process of making lactose. Exposure to "enhanced" sunlight by light-emitting diode (LED) at specific wavelengths accelerates this breakdown to enable the processing of a pale solution at low exposure duration. Even after a moderate exposure to sunlight by LED, the solution is still very yellow. However, white lactose can be obtained when lactose is crystallized after the LED exposure. So even if the effect on the yellow color of the solution was small after an initial LED exposure, the effect of color in the crystals can be great after they have been washed. This indicates that most or all of the yellow color observed after the exposure is not coming from intact riboflavin, and that this new yellow component is not part of the crystallized structure.

As discussed in detail below, the conditions that breakdown the lactose for use in the methods and apparatus (units) of the invention are based on a variety of parameter and they may vary depending on the use.

The conditions include using a specific range of wavelength of light. In terms of which wavelength of light is most effective, a test showed the best performance is in the range of 440-457 nm; the relative efficiency at 460-465 nm is about 90%; the relative efficiency is about 70% at 365 nm; and only 40% at 480-485 nm. Thus, the optimal wavelength for color reduction is 440-457 nm, which is more effective than 360-475 nm, which is even more effective than 340-500 nm. Accordingly, generally the conditions that breakdown riboflavin involve using a light source emitting a wavelength of about 360-475 nm. In one embodiment, the light source emits a wavelength of about 440-457 nm. In another embodiment, the light source emits a wavelength of about 450 nm. A variety of light sources may be used.

In certain preferred embodiments, the light source is a light emitting diode. The wattage of the LED or other light source may vary depending on the conditions and exposure duration. In some embodiments, the wattage is from about 50-70 W.

In certain embodiments of the disclosure, the method and apparatus are designed in such a way that the lactose solution is exposed to a total of 1-100 kW of light, alternatively a total of 5-20 kW of light, alternatively a total of 5-50 kW, a total of 6-15 kW of light, alternatively a total of 6-14 kW of light. In certain preferred embodiments, the lactose solution is exposed to 5 kW to 20 kW of light. In other embodiments, lactose solution has a specific exposure of 500 [J/kg] to 10000 [J/kg], alternatively 750 [J/kg] to 7500 [J/kg], alternatively 750 [J/kg] to 5000 [J/kg], alternatively 1000 [J/kg] to 3500 [J/kg] of feed (lactose solution). In certain preferred embodiments, the lactose solution has a specific exposure of 1000 [J/kg] to 3500 [J/kg] of feed (lactose solution).

In an embodiment of the present invention, if a very high LED exposure is given under ideal conditions, the solution could become very faintly colored. This indicates that even the broken down, yellow components can be broken further down to uncolored or very faintly colored components. A second breakdown may not be important in lactose processing where the crystals are washed, but in other processes where the first yellow breakdown component is not washed away, then a second breakdown may be required to get the product dramatically reduced in color. Such a process could be the production of white permeate powder where the crystals are not washed. This presents an opportunity for the creation of a new norm in the permeate powder industry.

Blue light at about 450 nm in the present invention has the highest efficiency. In this invention, LEDs are used for breaking down the riboflavin. High power LEDs with a narrow band are readily available in this part of the light spectrum making it feasible to give light exposure at this wavelength in the kilowatt (kW) range even in a compact solution.

The efficiency of the process depends on temperature, pH, and turbidity of the feed (lactose solution)—the fluid flow rate of the lactose solution.

Ideal conditions for having maximum breakdown of riboflavin at minimum exposure is when the lactose formulation is hot and clear. Such conditions include from about 0-80 degrees Celsius (C). Accordingly, in certain embodiments the conditions that breakdown riboflavin include exposing a lactose containing solution at a temperature of about 0-80 degrees Celsius, alternatively about 70-80 degrees Celsius, alternatively about 50-70 degrees, alternatively about 5 degrees Celsius to light having a suitable wavelength as described above.

A temperature of about 70-80 degrees Celsius (C) is ideal in processing the lactose solution (the "product") when there is no protein present. At a temperature of 50-70 degrees C., efficiency is still high; at a temperature of 30-50 degrees C., efficiency is reduced; at a temperature of 15-30 degrees C., the efficiency is further reduced; and at a temperature of 0-15 degrees C., the efficiency is low, but it is still feasible to compensate by installing more LEDs or increasing the wattage of the LEDs in the unit. If holding of the product at a hot temperature is short in duration, then even higher temperatures may be favorable. This means that a unit embodying the present invention combines very well with a pasteurizer/sterilizer where a product is at an elevated temperature for a relatively short period of time and where a light unit, i.e., the portion of the system containing the LED, is used as a holding cell for the heat treatment. It is the product stability which defines how high and long the heat exposure can be without unwanted degradation of other components than riboflavin.

Breakdown of the derivative, yellow breakdown component of riboflavin has the same tendency to breakdown as riboflavin itself. Turbidity of the lactose solution product reduces effects of the LED exposure significantly, but this can partly be compensated for by ensuring that the portion of the solution with higher levels of turbidity is near the glass where the light enters to the product, so that riboflavin is exposed to the light where the efficiency is highest.

Cold lactose solution products at 5 degrees C., which create a very turbid solution, requires a higher exposure to LED to remove riboflavin and an even higher exposure to remove the yellow breakdown product of riboflavin. Typically, the product will be clear when it is cold since typically it has not yet been heat treated where the calcium phosphate precipitate, such as e.g., CaP (calcium monophosphide), will precipitate and increase turbidity significantly.

The most important parameters influencing the efficiency of the breakdown is the wavelength of the light, and temperature and turbidity of the to-be processed lactose solution. However, it should be appreciated that other solution parameters will also influence efficiency of the breakdown, e.g., the pH of the lactose solution.

In certain embodiments of the disclosure, the lactose solution has an alkaline pH. In other embodiments, the lactose solution has an acidic pH.

Other uses of the present invention are also contemplated. For example, a unit embodying the present invention may be used on any liquid containing riboflavin. The unit will break down the riboflavin and if applied in high enough dose, it will nearly remove all of the yellow color coming from riboflavin or any of its derivative or breakdown products. For example, this may be used in making white whey powder or white whey permeate, which is a new product not existing on the market today. It is likely that other yellow substances can be broken down using the same unit as used on lactose solutions where the needed level of light exposure will depend on how stable the yellow component is.

Other colored components or formulations with a color different from yellow can most likely be broken down using the same principle, where the optimal wavelength of the light source is likely to be at or near the wavelength where the component has the highest absorbance.

A unit embodying the present invention can be used for to expose light to any component and/or formulation from any origin in the visual-near area of 200-1,000 nm with the purpose of facilitating chemical and/or physical changes to any component in a given feed (lactose solution)—primarily of dairy origin, like lactose and/or a biological origin—using primarily LEDs.

Light exposure to feeds such as living biological material (algae, bacteria, yeast, and molds) to change the metabolomics and expression of the organism and/or serve as positive stress factor during fermentation and API production. Some bacterial cultures fungi and algae use light as a source of energy for reproduction. Accordingly, in one embodiment, the artificial LED light of the disclosure could be used for growth and or expression/metabolism manipulation where sunlight is not an option (space travel, arctic areas, nuclear winters etc.). In certain embodiments, this application can be used for liquids in the same manner as the indoor greenhouses today for surface exposure to plants.

In an embodiment, after riboflavin is broken down, the molecules are smaller. If the molecules become small enough, they can potentially be separated from, for example, the lactose by use of nanofiltration (NF) membranes or other suitable membranes. If any of the breakdown products are volatile, then it becomes feasible to remove these by use of vacuum, e.g., during concentration on an evaporator running at vacuum. Accordingly, in certain embodiments of the disclosure the method involves removing riboflavin breakdown products.

If other components in the product are affected by the light exposure and undesired components are created, then these can possibly be removed from the product in a similar manner by use of membranes or via vacuum.

Exposure conditions may influence which derivative breakdown components of riboflavin are made. Varying the exposure conditions also enables controlling the chemical pathways of the breakdown reaction. For example, a very high exposure of a solution at a high temperature and in a clear media will not only breakdown riboflavin, but also at least yellow breakdown components of riboflavin. In contrast, a moderate dose at low temperature may yield only the initial breakdown of riboflavin without breaking these components further down. Depending on the application, it may be advantageous to control the level of breakdown using these or other parameters influencing the efficiency of the breakdown.

In an embodiment, it may be beneficial to run a solution product at a cold temperature and with only enough light exposure to get the reduction of riboflavin which is desired in order to only make one breakdown of riboflavin and not break the derivative breakdown products further down. This can most easily be done when product temperature is low, but it is also feasible to do in a hot application by increasing turbulence and reducing the light emission to avoid zones with very high exposure and low exchange of product.

In another embodiment, it may be beneficial to deliberately breakdown not only riboflavin, but also at least the yellow, derivative breakdown components by running them with very high exposure. This is most easily done when product temperature is high. The product breakdown can be further enhanced by having low turbulence, resulting in zones near the sight glasses where the exposure is very high and exchange of product low.

In this way, the choice of where to install a unit in the process can be influenced by not only where the unit is the most effective, but also by the breakdown components of riboflavin and how to remove them most easily from the process.

A level of breakdown of riboflavin can be controlled by splitting a process stream in two-one part which is exposed to light giving virtually complete breakdown of riboflavin in this part, and the second part bypassing the unit resulting in no breakdown in this part. If, for example, 80% is going through the unit under these conditions and 20% is bypassed, then this will result in an approximately 80% reduction of riboflavin.

A controlled breakdown can also be achieved by reducing the light exposure to the product to a level where the desired reduction of riboflavin is obtained. If the feed is very stable over time, then this may simply be done based on experience. If the feed varies over time, then it will be advantageous to test the level of riboflavin in-line or at-line and use this to adjust the light exposure.

An in-line sensor could be based on fluorescence levels, where difference (if any) in fluorescence behavior of riboflavin and the yellow, breakdown derivative components of riboflavin is used to differentiate the two components. High-performance liquid chromatography (HPLC), which is the standard method used for determining riboflavin in foods, may also be used for controlling the light exposure either in an in-line or online configuration.

LEDs may lose efficiency over time. To avoid this, which would impact the exposure of the product in the unit over time, this can be compensated for by increasing the applied amps to the LEDs. This can be done by using the characteristic decay of the used LEDs over time combined with the characteristic relationship between applied amps and light emission. When these are known, a programmable logic controller (PLC) of the unit can compensate so that even LEDs that have been used for 5,000 hours give the same level of light as they did when they were initially installed. The unit embodying the present invention will then perform the same over time. However, this may cause the lifetime of the LEDs to be shortened.

Amps of the LEDs can also be adjusted based on a built-in LED light source running under the same conditions as those LEDs exposing the product. However, the built-in LED light source may send the light to a sensor configured to measure actual performance of the LED. As LEDs decay, the amps to them may be increased to maintain the same light exposure. In this embodiment, it is vital that the LED sensor is completely fixed so no artificial decay is measured due to a change in angles, distance, or other. It is also vital that the decay of the sensor is significantly lower than that of the LED. In an example embodiment, this can be ensured by installing a shutter or a similar apparatus, so the light sensor is only exposed to light one-tenth of the time or less compared to the time the LEDs are active. For example, the sensor may be exposed to 1-2 hours every day where the LEDs are running 20-24 hours every day.

In an example embodiment, the same unit may also be used for disinfection of water or the like, by replacing the LEDs used for decoloring lactose with other LEDs with a wavelength suitable for killing bacteria's typically in the UV area, such as at 254 nm. In this case, it is vital that the sight glass used is well suited for transmitting light at these wavelengths.

If a product treated contains more than one component which a desire to break down, and these more than one components do not have the same color, then the unit can be made using more than one LED, each having different wave lengths that are optimal for each of the components which it is desired to breakdown. If some of the components are a breakdown component of another component, then it may be beneficial to place some or all of LEDs suited for breaking down a breakdown component downstream of the LEDs suited for breaking down the initial colored component.

In an embodiment, the unit can be made sanitary and easy to CIP together with the line in which it is installed. This can be done by placing sight glasses onto pipes forming modules where a product is running inside. Light is then applied through the sight glasses into the product while it is pumped through the pipe. If product flow is too low for the pipe size used for the modules, then a booster pump can be added to the system, which runs during CIP to ensure sufficient flow. As a further sanitary measure, the inside of the modules where the light is applied can be electropolished which improves cleanability due to having a smoother surface. This also improves efficiency of the unit when running a product with low turbidity since the electropolished surfaces more efficiently reflect light which has not yet been absorbed in the product.

When a solution embarks from the unit at the end of production before CIP, this can be done together with the pushout of the pipe in which it is installed while adjusting the push volume accordingly. If a very low dilution of the solution is desired, this can be done by making the modules within the unit drainable, so that product can be drained out of the unit with no dilution, before the unit is cleaned in place (CIP'ed).

The Tables below illustrate examples of embodiments of the disclosure.

TABLE A

Examples of suitable wavelengths of light

| Wavelength (WL) 1 | WL 2 | WL 3 | WL4 |
|---|---|---|---|
| 200-1,000 nm | About 360-475 nm | About 440-457 nm | About 450 nm |

TABLE B

Examples of suitable temperature of lactose solution

| Temperature 1 (T1) | T2 | T3 | T4 |
|---|---|---|---|
| About 0-80° C. | About 70-80° C. | About 50-70° C. | About 5° C. |

TABLE C

Examples of suitable total amount of light energy to which lactose solution is exposed

| Amount of Energy 1 (AE 1) | AE2 | AE 3 | AE 4 |
|---|---|---|---|
| 1-100 kW | 5-20 kW | 6-15 kW | 6-15 kW |

TABLE D

Examples of suitable amounts of specific exposure as a function of feed (lactose solution)

| Specific Exposure (SP 1) | SP 2 | SP 3 | SP 4 |
|---|---|---|---|
| 500 [J/kg] to 10000 [J/kg] of feed | 750 [J/kg] to 7500 [J/kg] of feed | 750 [J/kg] to 5000 [J/kg] of feed | 1000 [J/kg] to 3500 [J/kg] of feed |

Any of the values in Table A and B can be used in combination in some embodiments. In other embodiments, any of the values in Tables A-C can be used in combination. In other embodiments, any of the values in Tables A, B, and D can be used in combination. Examples of embodiments are shown below.

| Embodiment | Wavelength | Temperature | Amount of Energy/ Specific Expose |
|---|---|---|---|
| 1 | WL1 | T1, T2, T3, or T4 | |
| 2 | WL1 | T1, T2, T3, or T4 | A1, A2, or A3 |
| 3 | WL1 | T1, T2, T3, or T4 | SP1, SP2, SP3, or SP4 |
| 4 | WL2 | T1, T2, T3, or T4 | |
| 5 | WL2 | T1, T2, T3, or T4 | A1, A2, or A3 |
| 6 | WL2 | T1, T2, T3, or T4 | SP1, SP2, SP3, or SP4 |
| 7 | WL3 | T1, T2, T3, or T4 | |
| 8 | WL3 | T1, T2, T3, or T4 | A1, A2, or A3 |
| 9 | WL3 | T1, T2, T3, or T4 | SP1, SP2, SP3, or SP4 |
| 10 | WL4 | T1, T2, T3, or T4 | |
| 11 | WL4 | T1, T2, T3, or T4 | A1, A2, or A3 |
| 12 | WL4 | T1, T2, T3, or T4 | SP1, SP2, SP3, or SP4 |

In certain embodiments of the disclosure, the exposure conditions are varied to control the breakdown components. The speed of reaction and the reaction pathway of the photo decomposition of riboflavin are depending on several process parameters which can be varied and controlled (such as temperature, pH and intensity) and the nature of the feed and composition has an impact. For example, in certain embodiments, the ratio of lumiflavin and lumichrome as breakdown components can be manipulated by changing the temperature of blue light exposure. Exposing at the higher temperature will favor formation of lumiflavin compared to exposure at a lower temperature.

Also manipulating the pH of the sample will impact the reactions where a higher pH will favor formation of lumiflavin vs exposure at lower pH where the formation of lumichrome is more favored. In this way the process can be altered to facilitate the desired breakdown components at the specific application.

In a setting where it is prioritized to control the formation of specific breakdown components higher than the installed effect the exposure temperature could be reduced to about 55° C. which favors the formation of lumichrome over lumiflavin. The exposure at lower temperature will require an increased installed effect for achieving similar levels of riboflavin inactivation at 75° C.

Alternatively, if the favored breakdown component is lumiflavin the exposure can be performed at elevated temperatures to 75° C. Accordingly, in certain embodiments, the methods of disclosure are carried out at about 55° C. In alternate embodiments, the methods of the disclosure are carried out at a temperature of about 75° C.

In certain embodiments, where the formation of lumichrome over lumiflavin is desired, the exposure can be conducted at a lower pH. This could be by actively adjusting the pH or choosing a place in the process where the pH is lower such as prior to an alkaline pH adjustment in the existing process.

Reducing the light intensity can also change the breakdown product formation where the lumichrome formation is more favored at a lower energy level compared to a higher energy level. In certain embodiments, this can be achieved by using LEDs with less intensity per square area while keeping the effect the same by adding more exposure square area.

In certain embodiments of the methods, the local light intensity is reduced to favor the formation of lumichrome over lumiflavin by increasing the turbulence in the system. Without being bound by theory it thought that such changes in turbulence favors less local high intensity spots at the same average effect.

In other embodiments, the light intensity is reduced by installing lower effect LEDs and increasing the holding time in the unit to favor formation of a specific breakdown component such as e.g., lumichrome vs. lumiflavin.

In other embodiments, the intensity of the installed lamps volumetric flowrate are reduced to keep a constant effect at a lower local intensity to favor the formation of a specific breakdown component, such as e.g., lumichrome vs. lumiflavin.

In alternate embodiments, the local intensity is changed by mechanically changing the flow by static mixers upstream of the apparatus of the claimed invention to achieve a reduced local intensity at the same installed effect to favour formation of a specific breakdown component, such as e.g., lumichrome vs. lumiflavin.

In further embodiments, the local exposure time is reduced by increasing the turbulence between high intensity zones to ensure a minimum local exposure at the same effect to favor formation of a specific breakdown component, such as e.g., lumichrome vs. lumiflavin.

In other embodiments, the methods of the disclosure rely on use of prisms to change light reflections and or transmission for better distribution of the light treatment to achieve a reduced local intensity at the same overall effect. Alternatively, the prism may be used to change light reflections and or transmission for increased local intensity of the light treatment to favor formation of a specific breakdown component such as lumiflavin vs. lumichrome.

In alternate embodiments, the formation of the breakdown products can be manipulated by the addition of minerals and/or buffers and hereby manipulating the formation of the breakdown products In certain embodiments, any use of fractionation prior to blue light processing can be used manipulate the formation of breakdown products by changing composition of the feed.

In certain embodiments, it is desirable to favor the formation of a specific breakdown component, such as lumiflavin over lumichrome, in these embodiments the exposure can be conducted at a higher pH (acidic pH). Exposure at the higher pH can be achieved by actively adjusting the pH or choosing a place in the process where the pH is higher such as, for example, prior to an alkaline pH adjustment in the existing process.

Increasing the light intensity can also change the breakdown product formation. For example, the lumiflavin formation is more favored at a higher local energy level compared to a lower energy level. In one embodiment, this increase is light intensity is achieved by using LEDs with higher intensity per square area and keeping the effect the same by adding more exposure square area. In another embodiment, the increase in light intensity is achieved by reducing the turbulence in the system which favors high local intensity spots at the same average effect.

In certain embodiments, the exposure time can be altered by installing higher effect LED's to increase the local intensity to favor formation of a specific breakdown component, such as lumiflavin vs. lumichrome.

In other embodiments, the intensity of the installed lamps whilst increasing the volumetric flowrate is increased to keep a constant effect at a higher local intensity to favor the formation of a specific breakdown component, such as lumiflavin vs. lumichrome.

Changing the local intensity by mechanically changing the flow by static mixers between to achieve an increased local intensity at the same installed effect to favour formation of a specific breakdown component, such as lumiflavin vs. lumichrome.

Alternatively, the local exposure time can be reduced by changing the turbulence between high intensity zones to favor formation of a specific breakdown component such as lumiflavin vs lumichrome.

Alternatively, any processing, such as but not limited to (homogenization, separation, cavitation, heating, cooling, evaporation, flashing, degassing, chromatography), upstream of the exposure to can be changed to manipulate the feed to favor the formation of a specific breakdown component e.g., lumichrome or lumiflavin.

Alternatively, any processing such as but not limited to (homogenization, separation, cavitation, heating, cooling, evaporation, flashing, degassing, chromatography) downstream of the exposure can be altered to manipulate and/or extract and or purify the breakdown components Without further description, it is believed that one of ordinary skill in the art can, using the preceding description and the following illustrative examples, make and utilize the present invention and practice the claimed methods. The following working examples, therefore, specifically point out the preferred embodiments of the present invention and are not to be construed as limiting in any way the remainder of the disclosure.

It will be appreciated that the foregoing description provides examples of the disclosure. However, it is contemplated that other implementations of the invention may differ in detail from the foregoing examples. All references to the invention or examples thereof are intended to reference the example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated. All methods described herein can be performed in any suitable order unless otherwise indicated herein or otherwise clearly contradicted by context.

The following examples are offered by way of illustration and not by way of limitation.

EXAMPLES

Below are three experiments and results of the same.

Example 1

Clear liquid exposed at elevated temperatures and adjusted for pH (placed after a clarifier just before an evaporation step). In this example, 30 mg of riboflavin was added to 5 liters of 20% dissolved yellow lactose to get a solution with a representative level of riboflavin in TS corresponding to what can be seen for concentrated whey ultra-filtration (UF) permeate. The solution was heated and maintained at 70-75 degrees C. and the pH was adjusted to 6.7. The solution was kept in a blinded off DN100 stainless steel pipe with a sight glass mounted on the top. The solution was stirred with a magnetic stirrer at the bottom of the pipe and exposed to light through the sight glass at wavelength of 455 nm for 45 seconds using a 70 W LED. In an installation with a flow of 40,000 liters per hour (l/h) at 20% TS, this corresponds to an installed effect of approximately 7 kW. Using a color reflection detector, the b-component (LAB color plane) was measured to be 10.1 prior to the LED exposure and 6.5 after the exposure. Part of the exposed lactose solution was then concentrated on a lab scale evaporator to approximately 65 Bx (Degree Brix), whereafter it was slowly cooled down to ambient temperature overnight while kept in movement, which makes the lactose crystalize in the solution. After crystallization, the crystals were washed 3 times with a 5% lactose solution using a filter with suction. The resulting powder was dried and analyzed for riboflavin. The result was below the detection limit of 0.1 ppm. Thus, the result was below the typical limit for white lactose in food applications of 2 ppm. The reconstituted powder diluted to 20% was measured to have a b-component of −0.95. For comparison, reconstituted yellow lactose at 20% was measured to have a b-component of 2.4. Reconstituted lactose of analytical grade was measured to have b-component of −1.2.

Example 2

Clear liquid at ambient temperature without a pH adjustment (comparable with placement at a permeate side just after the UF/NF or RO). In this example, 45 mg of riboflavin was added to 5 liters of 20% dissolved yellow lactose to get a solution with a high level of riboflavin in TS corresponding to what can be seen for concentrated whey UF permeate. The solution was kept at ambient temperature with no pH adjustment from its measured value of 5.4. The solution was kept in a blinded off DN100 stainless steel pipe with a sight glass mounted on the top. It was stirred with a magnetic stirrer at the bottom of the pipe and exposed to light through the sight glass at a wavelength of 455 nm for 40 seconds using a 70 W LED. In an installation with a flow of 40,000 l/h at 20% TS, this corresponds to an installed effect of approximately 6.2 kW. Using a color reflection detector, the b-component of the solution was read to be 11.7 prior to the light exposure and 11.3 after the exposure. Part of the exposed lactose solution was then concentrated on a lab scale evaporator to approximately 71 Bx, whereafter it was slowly cooled down to ambient temperature overnight while still trying to keep in movement. Due to the high viscosity, the liquid was not moving the next morning. After crystallization, the crystals were washed three times with a 5% lactose solution using a filter with suction. The powder was dried and analyzed for riboflavin. The result was below 1.35 ppm riboflavin. Even though the efficiency clearly was far reduced at ambient temperature, the riboflavin was still below typical limit for white lactose in food applications of 2 ppm. The reconstituted powder diluted to 20% was measured as having a b-component of 0.1. For comparison, reconstituted yellow lactose at 20% was measured to have a b-component of 2.4. Reconstituted lactose of analytical grade was measured to have a b-component of −1.2.

Example 3

Permeate powder was dissolved, creating a more turbid solution to cover the process variability in relation to adding an installation where the feed is under less control. Whey UF permeate powder was reconstituted to get 5 liters of a 20% solution. Due to the heat exposure the permeate had undergone during production of the powder, the Calcium was no longer in solution and made the solution very turbid. The solution was heated and maintained at 70-75 degrees C. The solution was kept in a stainless-steel container, stirred with a magnetic stirrer, and exposed to light at a wavelength of 455 nm for 90 seconds using a 70 W LED. In an installation with a flow of 40,000 l/h at 20% TS, this corresponds to an installed effect of approximately 14 kW. Using a color reflection detector, the b-component was measured to be 7.7 prior to the LED exposure and 6.7 after the LED exposure. Part of the exposed lactose solution was then concentrated on a lab scale evaporator to approximately 58 Bx, whereafter it was slowly cooled down to ambient temperature overnight while kept in movement. After crystallization, the crystals were washed 4 times with a 5% lactose solution using a lab scale centrifuge. The last washing was done using a filter with suction. The powder was then dried. The reconstituted powder was diluted to 20% and filtrated to eliminate the residual Ca precipitate's effect on color. Then it was measured for color and had a b-component of −0.35. For comparison, 20% solutions of known samples with riboflavin less than 0.1 ppm and 1.35 ppm were analyzed immediately after measuring a b-component of −0.4 and +0.3, respectively, indicating that this sample was, color wise, between the two (−0.4 to +0.3) but close to the sample with less than 0.1 ppm riboflavin.

While the invention has been described and illustrated herein by references to various specific materials, procedures, and examples, it is understood that the invention is not restricted to the combinations of material and procedures selected for that purpose. Numerous variations of such details can be implied as will be appreciated by those skilled in the art. It is intended that the specification and examples be considered as exemplary, only, with the true scope and spirit of the invention being indicated by the following claims.

Numbered Embodiments of the Inventions

Examples of numbered embodiments of the invention are shown below.

Embodiment 1. A method of removing yellow color of riboflavin in a lactose solution, the method comprising: receiving a lactose solution comprising riboflavin, via an apparatus having a substantially clear medium that allows light to pass through, wherein the light is configured to breakdown the riboflavin comprised within the solution, creating broken down riboflavin; and exposing, through the substantially clear medium, the lactose solution to light under conditions to breakdown the riboflavin comprised within the solution. to thereby remove yellow color of riboflavin.

Embodiment 2. The method of embodiment 1 further comprising crystallizing the lactose solution after exposure to light.

Embodiment 3. A method for removing yellow color of riboflavin comprising exposing a lactose solution comprising riboflavin to light under conditions to breakdown the riboflavin comprised within the solution to thereby remove yellow color of riboflavin.

Embodiment 4. The method of embodiment 4 further comprising removal of the breakdown product of riboflavin.

Embodiment 5. The method of any one of embodiments 1 to 4, wherein the method comprises exposing the lactose solution to light having a wavelength of 360-475 nm.

Embodiment 6. The method of any one of embodiments 1 to 4, wherein the method comprises exposing the lactose solution to light having a wavelength of 440-457 nm.

Embodiment 7. The method of any one of embodiments 1 to 4, wherein the method comprises exposing the lactose solution to light having a wavelength of about 450 nm.

Embodiment 8. The method of any one of embodiments 5-7, wherein the light is generated by a light emitting diode.

Embodiment 9. The method of embodiment 8, wherein the light emitting diode has a wattage from 50-70 W.

Embodiment 10. The method of any one of embodiments 1-9, wherein the method comprises exposing a lactose solution at a temperature of 0-80° C. to the light.

Embodiment 11. The method of embodiment 10, wherein the method comprises exposing a lactose solution at a temperature of 70-80° C. to the light.

Embodiment 12. The method of embodiment 10, wherein the method comprises exposing a lactose solution at a temperature of 50-70° C. to the light.

Embodiment 13. The method of embodiment 10, wherein the method comprises exposing a lactose solution at a temperature of about 5° C. to the light.

Embodiment 14. The method of any one of embodiments 1-13, wherein the lactose solution has an alkaline pH.

Embodiment 15. The method of any one of embodiments 1-13, wherein the lactose solution has an acidic pH.

Embodiment 16. The method of any one of embodiments 1-15, wherein the lactose solution is exposed to a total of 1-100 kW of light.

Embodiment 17. The method of embodiment 16, wherein the lactose solution is exposed 5-20 kW of light.

Embodiment 18. The method of embodiment 16, wherein the lactose solution is exposed to a total of 6-15 kW of light.

Embodiment 19. The method of embodiment 16, wherein the lactose solution is exposed to a total of 6-14 kW of light.

Embodiment 20. The method of any one of embodiments 1-15, wherein the lactose solution has a specific exposure of 500 [J/kg] to 10000 [J/kg].

Embodiment 21. The method of embodiment 20, wherein the lactose solution, wherein the lactose solution has a specific exposure of 1000 [J/kg] to 3500 [J/kg].

What is claimed is:

1. A method of removing yellow color of riboflavin in a lactose solution, the method comprising:
passing a substantially clear lactose solution comprising riboflavin through a conduit having a light source emitting light at a wavelength of 440-475 nm; and
exposing the lactose solution to 500 [J/kg] to 10000 [J/kg] of light from the light source to breakdown the riboflavin comprised within the solution to thereby remove yellow color of riboflavin as it passes through the conduit.

2. The method of claim 1 further comprising crystallizing the lactose solution after exposure to light.

3. A method for recovering white lactose crystals from whey comprising passing a whey solution by a light source under conditions to breakdown the riboflavin comprised within the whey, wherein the passing comprises exposing the whey solution to 500 [J/kg] to 10000 [J/kg] of light, and then crystallizing the whey solution to form white crystals.

4. The method of claim 3, wherein the method generates lumiflavin and lumichrome, and wherein the method further comprises removal of lumiflavin and lumichrome.

5. The method of claim 3, wherein the method comprises exposing the lactose solution to light having a wavelength of 440-457 nm.

6. A method for removing yellow color of riboflavin comprising exposing whey permeate or whey comprising riboflavin at a temperature of 50-80° C. to 500 [J/kg] to 10000 [J/kg] of light having a wavelength of 440-457 nm.

7. The method of claim 6, wherein the method comprises exposing the lactose solution to light having a wavelength of about 450 nm.

8. The method of claim 5, wherein the light is generated by a light emitting diode.

9. The method of claim 6, wherein the method comprises converting riboflavin to lumiflavin and lumichrome.

10. The method of claim 3, wherein the method comprises exposing a lactose solution at a temperature of 70-80° C. to the light.

11. The method of claim 3, wherein the whey solution has an alkaline pH.

12. The method of claim 3, wherein the whey solution has an acidic pH.

13. The method of claim 3, wherein the whey solution is exposed to a total of 1-100 kW of light.

14. The method of claim 13, wherein the lactose solution is exposed 5-20 kW of light.

15. The method of claim 13, wherein the lactose solution is exposed to a total of 6-15 kW of light.

16. The method of claim 13, wherein the lactose solution is exposed to a total of 6-14 kW of light.

17. The method of claim 1, wherein the lactose solution is exposed to 1000 [J/kg] to 3500 [J/kg] of light.

18. The method of claim 3, wherein the whey solution is exposed to 1000 [J/kg] to 3500 [J/kg] of light.

19. The method of claim 1, wherein:
the conduit comprises a transparent section and wherein the light source is placed behind the transparent section; or
the light is placed internally inside the conduit.

20. The method of claim 6, wherein the lactose solution is exposed to 1000 [J/kg] to 3500 [J/kg] of light.

21. The method of claim 3, wherein the whey solution has a pH of 5.4-6.7.

* * * * *